April 5, 1927.
T. L. DAY
1,623,831
HEADLIGHT GLARESHIELD
Filed April 29, 1925
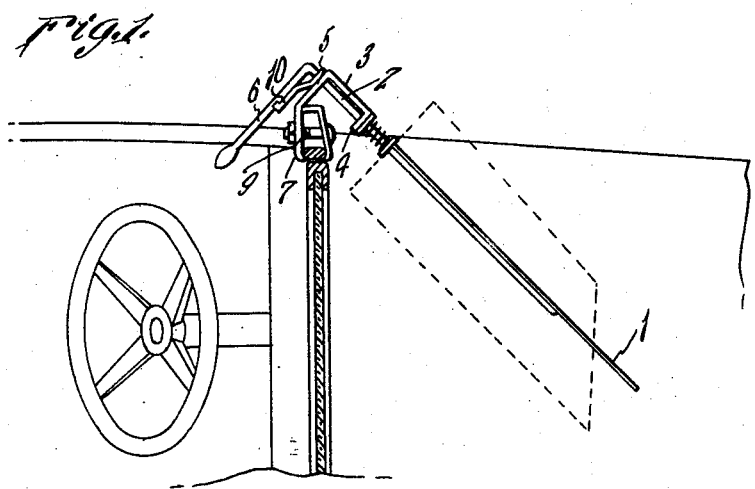
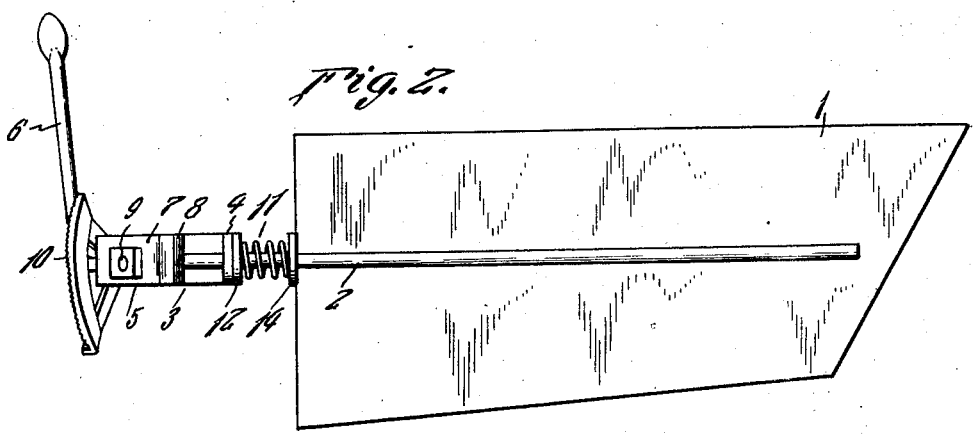
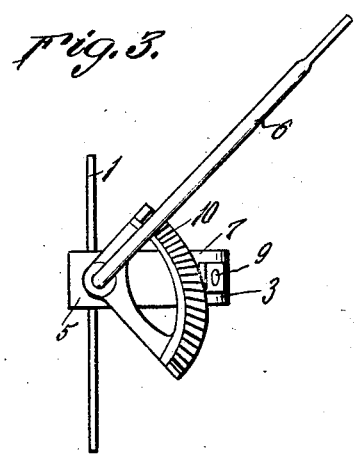
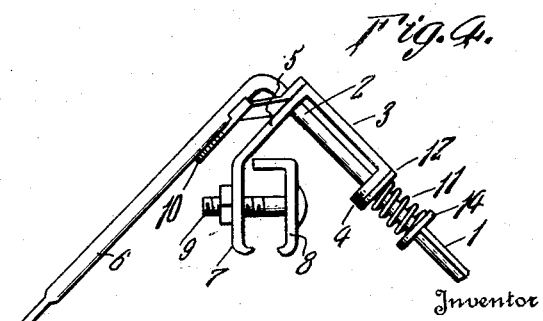
Inventor
T. L. Day Patented Apr. 5, 1927.

1,623,831

UNITED STATES PATENT OFFICE.

THURMAN L. DAY, OF INDIANAPOLIS, INDIANA.

HEADLIGHT GLARESHIELD.

Application filed April 29, 1925. Serial No. 26,723.

The object of the invention is to provide a device for mounting on the windshield of a vehicle at about the level of the eyes of the driver or operator for manipulation to position it to obstruct the beam of light projected by the headlights of an oncoming vehicle; to provide a construction of this character which may be instantaneously adjustable to secure the best position; to provide a device which may function when attached to assume a position in the direction of the length of the vehicle carrying the same, rather than in a position transverse thereto, thus providing for a free and unobstructed view ahead for the driver or operator of the vehicle; and to provide a device which is comparatively simple in construction and may, therefore, be manufactured cheaply and marketed at low cost.

With this object in view, the invention consists in a construction and combination of parts of which a preferred embodiment is illustrated in the accompanying drawings, wherein:

Figure 1 is a plan view showing the forward portion of the body of a vehicle with the invention applied thereto, the inoperative position being indicated in dotted lines.

Figure 2 is an enlarged elevational view of the device detached.

Figure 3 is an end elevational view of the structure of Figure 2.

Figure 4 is a top plan view of the bracket and adjusting means.

The shield 1 is preferably of the shape shown and constructed preferably of light sheet metal, such as aluminum, being secured by rivets or other appropriate fastening means to the supporting and actuating rod 2, the latter being carried by a bracket 3 in which it is mounted for angular or rotary movement. The bracket consists preferably of flat bar metal bent to provide the terminal ear 4 and the arm 5, the two being parallel to each other and bored to provide bearings for the rod 2, the rod at its free extremity being bent to provide a right angular arm 6 constituting an operating means for imparting angular or turning movement to the rod and thereby changing the angular position of the shield 1 in a vertical plane, so that it may assume any position between the horizontal and the vertical positions.

The bracket is secured to the windshield or other part of the body portion of the car that is most acceptable and the arm 5 is provided with a clamp for this purpose, one of the members 7 of the clamp consisting of an angular extension of the arm 5 and the complemental member 8 being secured to the member 7 by means of a bolt 9. Tightening the bolt secures the clamp and therefore the bracket 3 on the vehicle, and vertical adjustment on the support to suit the requirements may be had by changing the position of the clamp with reference to its support.

A toothed segment 10 is carried by the bracket 3 on the arm 5, the teeth being engageable by the operating arm 6 of the supporting rod and in order that the operating arm may be held in engagement with the teeth of the segment or sector, a spring 11 is placed on the rod 2 and compressed between washers 12 and 14, respectively abutting the ear 4 and the adjacent end of the shield 1. This spring tends to move the supporting rod 2 longitudinally in the bracket and thereby brings the operating arm into engagement with the teeth of the sector, over which it may be easily slid in effecting adjustment but which engage the operating arm with sufficient pressure to maintain any adjustment made.

The invention having been described, what is claimed as new and useful is:

A device for the purpose indicated comprising a bracket for attachment to the windshield frame of an auto vehicle, a rod journaled in said bracket and provided with an angular extremity serving as an actuating handle to impart turning movement to said rod, and a shield extending in the direction of the length of the rod and secured to the latter at the longitudinal central line of the shield, the bracket being provided with a toothed sector with the teeth of which said actuating handle is engageable, and the rod being provided with a compression spring disposed between the shield and the bracket and tending to move the rod longitudinally to effect engagement between the sector teeth and the handle.

In testimony whereof he affixes his signature.

THURMAN L. DAY.